United States Patent
Brazelton et al.

[11] Patent Number: 5,252,635
[45] Date of Patent: Oct. 12, 1993

[54] POLYMER ACTIVATION METHOD USING TWO SEPARATE MIXING ZONES

[75] Inventors: Carl L. Brazelton, Kankakee; Troy C. Litherland, Bradley, both of Ill.; J. Derek Green, Wellington, England

[73] Assignee: Stranco, Inc., Bradley, Ill.

[21] Appl. No.: 657,829

[22] Filed: Feb. 19, 1991

Related U.S. Application Data

[62] Division of Ser. No. 595,313, Oct. 10, 1990, abandoned, which is a division of Ser. No. 89,344, Aug. 25, 1987, abandoned.

[51] Int. Cl.$^5$ ................. C08L 1/08; C08L 33/26
[52] U.S. Cl. ......................... 523/313; 523/326; 523/334; 523/335; 524/501; 210/696
[58] Field of Search ............... 523/313, 326, 334, 335; 524/501

[56] References Cited

U.S. PATENT DOCUMENTS

| | | | |
|---|---|---|---|
| 2,008,684 | 7/1935 | Craddock | 259/97 |
| 2,212,260 | 8/1940 | Brothman | 106/167 |
| 2,249,263 | 7/1941 | Wheelwright, Jr. | 259/6 |
| 2,268,461 | 12/1941 | Nichols | 259/9 |
| 2,556,014 | 6/1951 | Tolman | 259/21 |
| 2,651,582 | 9/1953 | Courtney | 259/107 |
| 2,686,110 | 8/1954 | Carver | 23/285 |
| 2,740,696 | 4/1956 | Longwell | 23/252 |
| 3,252,689 | 5/1966 | Blomgren et al. | 259/8 |
| 3,252,689 | 5/1966 | Blomgren, Sr. et al. | 259/8 |
| 3,319,937 | 5/1967 | Wilson et al. | 259/8 |
| 3,389,970 | 6/1968 | Scheibel | 23/270.5 |
| 3,559,959 | 2/1971 | Davis et al. | 259/23 |
| 3,742,735 | 7/1973 | Verreyne et al. | 68/50 |
| 3,747,899 | 7/1973 | Latinen | 259/9 |
| 3,756,570 | 9/1973 | Buhner | 259/6 |
| 3,852,234 | 12/1974 | Venema | 260/29.6 M |
| 4,113,688 | 9/1978 | Pearson | 260/29.6 |
| 4,113,688 | 9/1978 | Pearson | 260/29.6 PM |
| 4,125,574 | 11/1978 | Kastner et al. | 260/884 |
| 4,171,166 | 10/1979 | Trowbridge et al. | 366/316 |
| 4,217,145 | 8/1980 | Gaddis | 106/170 |
| 4,218,147 | 8/1980 | Rosenberger | 366/162 |
| 4,243,636 | 1/1981 | Shiraki et al. | 422/225 |
| 4,470,907 | 9/1984 | Sencza | 210/192 |
| 4,522,502 | 6/1985 | Brazelton | 366/160 |

Primary Examiner—Paul R. Michl
Assistant Examiner—Andrew E. C. Merriam
Attorney, Agent, or Firm—Welsh & Katz, Ltd.

[57] ABSTRACT

A polymer activation apparatus for activating and diluting a liquid polymer with water includes, a vessel defining a cylindrical chamber divided into first and second processing zones, the polymer and water being supplied to the first processing zone, an impeller located in the first processing zone subjecting the polymer to a high shear rate for a short contact time to initiate dissolution and activation of the polymer, and the polymer being moved to the second processing zone under the force of the water supplied to the first processing zone, a second impeller in the second processing zone subjecting the polymer to a lower shear rate for a longer period to continue the polymer dissolution and activation process.

1 Claim, 5 Drawing Sheets

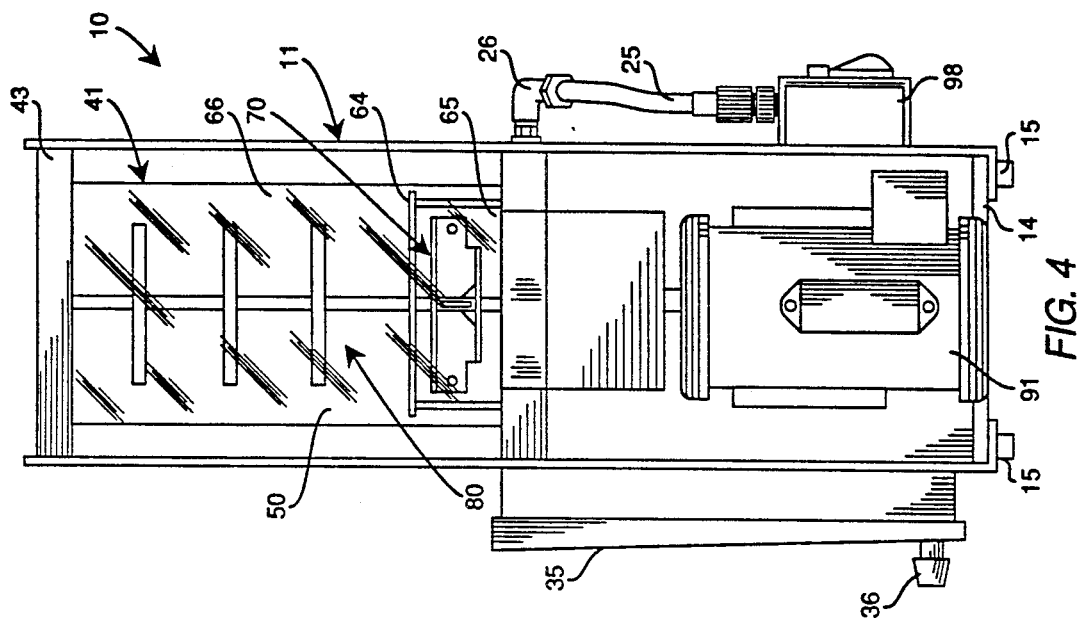
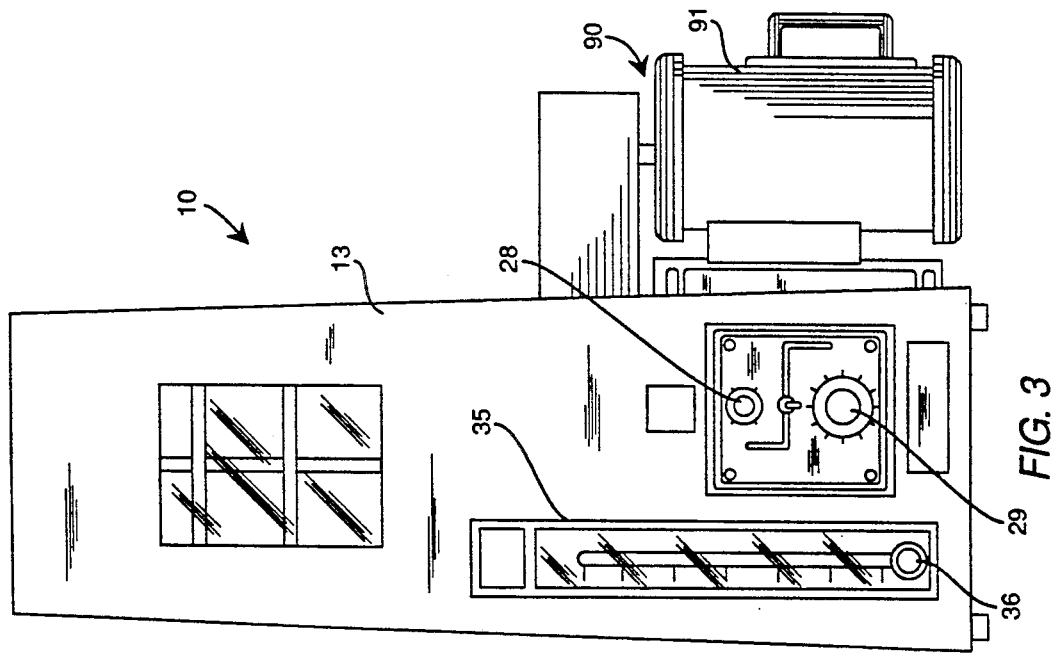

POLYMER ACTIVATION METHOD USING TWO SEPARATE MIXING ZONES

This is a division of application Ser. No. 07/595,313, filed Oct. 10, 1990 now abandoned, which is a division of Ser. No. 89,344, Aug. 25, 1987, abandoned.

BACKGROUND OF THE INVENTION

This invention relates generally to apparatus which mixes two liquids, and specifically to such an apparatus which mixes and activates a liquid polymer with water to provide a diluted activated polymer of particular use in the treatment of water for various purposes.

Solutions in water of certain high molecular weight water soluble resins are of considerable technical use as agents for viscosification, solids-liquids separation processes, additives for drilling fluids, for assisting oil recovery from subterranean formations, etc.

It is becoming increasingly recognised that the efficiency in the applications of the polymeric molecules of which these resins are comprised, and therefore their economy of use, is a function of the conformation of the molecules in solution at the time of the application of these solutions to their respective substrates. Conformation includes such features as the dimensions of the molecules in their solvated state, their degree of entanglement, the extent of chain branching, their ionicity and the relative dispositions of polyion and counter ion. Such features are described in the papers by Muller in Polymer Bulletin 1984, pages 391-5, by McCormick in Polymer Engineering Materials Science 1984, pages 471-474, and by Casky and Primus in Environmental Progress, vol. 2 1986, pages 98-103, for example.

The above mentioned resins are sold as concentrates in various physical forms such as finely ground powders, beads, concentrated solutions gels, water in oil emulsions of gels, oil dispersions of powders etc. They may be synthetic or natural materials. The synthetic materials are typified by the water soluble homopolymers of cationic acrylates or methacrylates, salts of acrylic acid, salts of 2 acrylamido 2 methyl propane sulphonic acid, acrylamide etc. or copolymers involving such monomeric species, all of which at high molecular weight (i.e. above 100,000) have appreciable flocculating or viscosifying action which is a function of their conformation and bonding capability. Natural materials would be typified by water soluble polysaccharides and graft copolymers thereof with synthetic moieties, certain natural gums, polysaccharides of microbial origin, etc.

Many applications require the polymer to be applied to the substrate as a dilute aqueous solution, commonly 2% or less and more typically 0.5% or less. To this end, various devices have been proposed for effecting solution and dilution to the required level of concentration. In one such apparatus, disclosed in U.S. Pat. No. 4,113,688, solutions are prepared from a gel form of a synthetic polyelectrolyte. The machinery employed is critical to the final polymer properties and a two stage gel cutting and dissolving machine is described therefor. Various other polymer powder dissolving machines are sold which feature devices for intimate contacting of the powder with water to avoid clumping of polymer gel so as to avoid the necessity for extreme conditions of agitation which would otherwise damage the polymer molecules. Damage to polymer molecules by high shear rate conditions in solution is well known as exemplified in the paper by Nakano and Minoura in the Journal of Applied Polymer Science, 1978, vol. 22, pp. 2207-2215.

In U.S. Pat. No. 3,852,234, there is described an apparatus and procedure for dissolution by inversion of water in oil emulsions of polymers and gums wherein a water-surfactant mix of high turbulence as characterized by a Reynolds number of greater than 50,000, is contacted by the emulsion prior to passage through a static mixer. Maximization of "activation" of the polymer is said to occur not within the mixer but some time after the egress of the mix from the apparatus, presumably in a subsequent storage vessel. Here activation is defined in terms of maximization of viscosity after exit and also in terms of settling tests where the solution is to be used as a sedimentation aid.

In U.S. Pat. No. 4,522,502, there is described an apparatus for mixing and feeding polymer dispersions and water, for the purpose of water treatments wherein high energy but low shear rate conditions are employed. This invention features a chamber containing a rotor which is designed to produce good polymer activation within a single mixing zone with minimum damage to molecular structure.

It is well understood by those acquainted with the art of polymer activation that commercially available solutions of polymers or those concentrated solutions of polymers resulting from commercially available powder dissolution systems or those polymer dispersions which are inverse emulsions, vary considerably in the ease with which they can be diluted or, inverted and then diluted, as the case may be. Such factors rest on the viscosities of the above mentioned dispersions, on their coherence, their viscoelasticity and their osmotic tendencies.

It is further well understood that because of these properties, the dissolution and inverting actions cannot be undertaken without application of hydrodynamic shearing action. For this reason problems arise due to the balance between forces necessary to cause the dispersion of the concentrates and those which are regarded as excessive in relation to the fragility of the molecules and aggregates thereof, the size and conformation of which are directly related to optimum performance.

The problem is complex in that during the course of dissolution and activation of the polymers, change in the conformation of the polymer molecule takes place very rapidly. These changes in the conformation are outwardly manifested in a rapid rise in the viscosity and viscoelasticity of the solution.

As activation proceeds toward optimum, the polymer molecule becomes more extended and is subject to mechanical damage. If hydrodynamic conditions are maintained at a level (shear rate) that is adequate to assure initial dispersion and activation for too long a period after the molecular conformation begins to change then polymer degradation will almost certainly result.

SUMMARY OF THE INVENTION

It is therefore an object of the present invention to provide a polymer activation method and apparatus which can uniformly mix polymer and water at a selected concentration at reduced cost.

Another object is to provide a polymer activation method and apparatus which effects maximum polymer activation of water while subjecting the polymer to a minimum damage to its molecular structure.

Another object is to provide a polymer activation method and apparatus which produces dilute polymer to a desired concentration consistently and repeatably and is precisely controllable.

Thus, the invention provides a polymer activation apparatus for receiving polymer and water and for activating and diluting the polymer, comprising first means defining a first processing zone, second means defining a second processing zone, third means defining a first outlet means communicating said first processing zone with said second processing zone, polymer inlet means for supplying the polymer to said first processing zone, water inlet means for supplying water under pressure to said first processing zone, second outlet means in fluid communication with said second processing zone for carrying the activated and diluted polymer away from said apparatus, the force of the water under pressure supplied to said water inlet means moving the polymer through said first processing zone and into and through said second processing zone to said second outlet means, impeller means in said first means for moving the polymer within said first processing zone and in a direction away from said first outlet means to mix the polymer and the water for activating the polymer, means for rotating said impeller means, said impeller means constructed and arranged to subject the polymer to a high shear rate for a short contact time to initiate dissolution and activation of the polymer, and agitating means in said second means for further mixing the polymer and the water in said second processing zone, said agitating means constructed and arranged to subject the polymer to a lower shear rate for a longer contact time to further dissolution and activation of the polymer.

The invention consists of certain novel features and a combination of parts hereinafter fully described, illustrated in the accompanying drawings, and particularly pointed out in the appended claims, it being understood that various change in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 3 is a front elevational view of apparatus;

FIG. 4 is a right side elevational view of the apparatus;

DESCRIPTION OF THE PREFERRED EMBODIMENT

Figure 1:
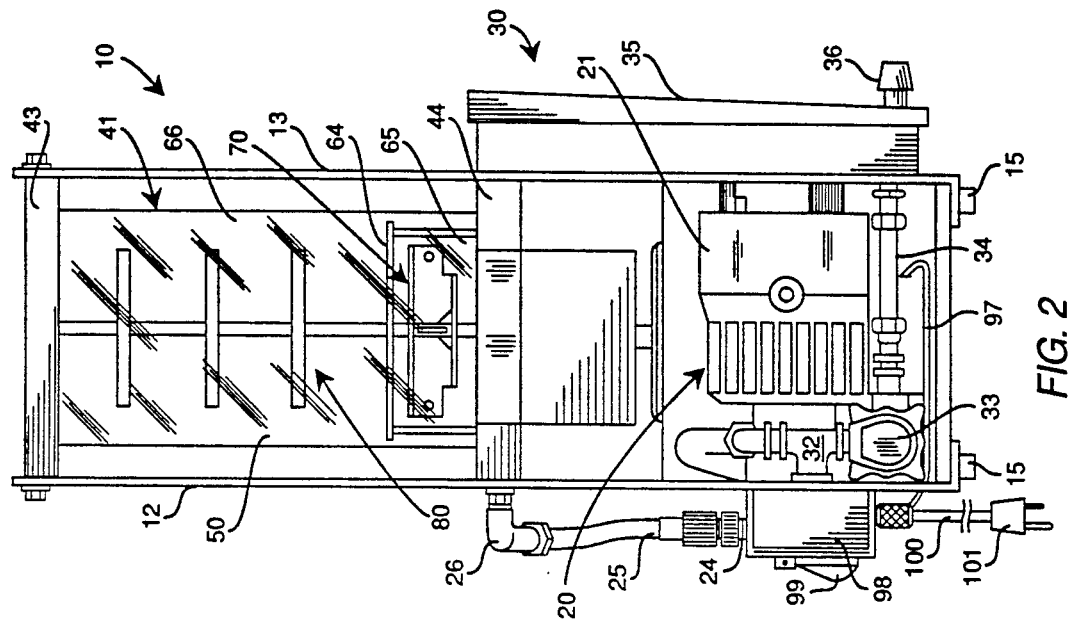
FIG. 1 is a rear elevational view of a multiple zone polymer activation apparatus incorporating the features of the present invention.
Figure 2:
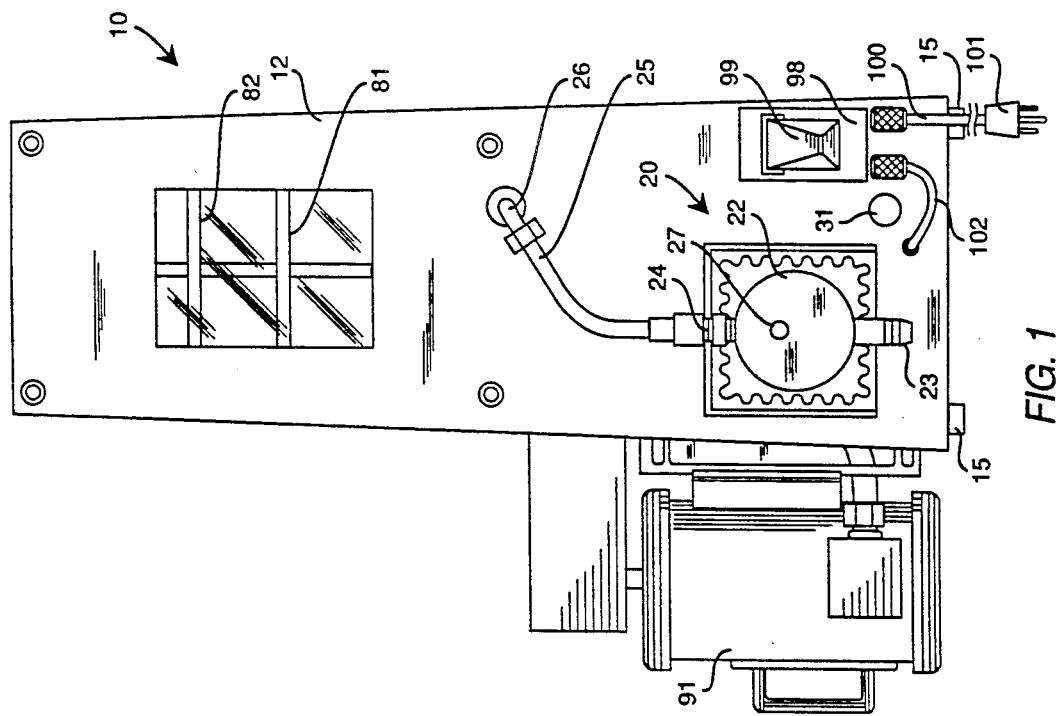
FIG. 2 is a left side elevational view of the apparatus.

Turning now to the drawings and more particularly to FIGS. 1-5 thereof, there is depicted a polymer activation apparatus incorporating the features of the present invention and generally designated by the numeral 10. The apparatus 10 is for use with a source (not shown) of concentrated polymer and a source of water. The apparatus 10 draws polymer from the source and receives water from the supply, mixes and activates the polymer and the water, and provides a diluted activated polymer of the desired concentration.

As will be shown, the polymer activation apparatus 10 comprises a multi-zone mixing chamber including a first processing zone in which the polymer and water are subjected to a high shear rate for a short contact time to initiate dissolution and activation, and a second processing zone in which the mixture is subjected to a lower shear rate to further the dissolution process and complete the activation. This particular two-zone processing arrangement optimizes the dissolution and activation of polymer without subjecting the polymer to excessive shearing conditions as could damage the polymer molecules. Subjecting the polymer molecule to a high shear rate is beneficial and necessary during initial contact of the polymer with water. As the aforementioned change in conformation takes place and dissolution begins, the polymer molecules become more fragile and the rate of application of energy has to be lowered to match that change. In accordance with one aspect of the invention, this is achieved through the use of a multi-zone mixing chamber with the first zone creating the high shear rate for a short period of time followed by a low shear rate over a longer period of time. In a particular embodiment disclosed, two zones are provided in a single housing with the first zone located below the second zone.

The polymer activation apparatus 10 comprises a frame 11 which is generally U-shaped in transverse cross section, as viewed in FIG. 4. The frame 11 includes a front panel 12 and a rear panel 13. The bottoms of the panels 12 and 13 are inturned and attached to a generally square base 14. A set of four feet 15 is attached to the inturned flanges of the panels 12 and 13. The polymer activation apparatus 10 comprises a polymer delivery mechanism 20, the basic element of which may be a non-gear type pump 21. The pump 21 includes a totally enclosed pump drive with no exposed moving parts and is capable of moving highly viscous materials such as concentrated liquid polymer. The output of the pump is pulsating. The pump 21 has an end or head 22 that is particularly adapted to pumping viscous polymer. An operative embodiment of the polymer activation apparatus 10 incorporated a pump made by Liquid Metronics, Incorporated of Acton, Mass. and particularly its model No. BP31-76PB. Such pump is adjustable to enable selection of the rate of flow of the polymer from 0.04 gallon per hour to 4.5 gallon per hour at a pressure of 50 psi. Such pump has an adjustable stroke length and stroke frequency and operates on 115 volts AC. The head 22 has an inlet fitting 23 for connection by way of tubing to a drum or tank (not shown) containing the undiluted or "neat" polymer. The head 22 also has an outlet fitting 24 which is connected to one end of tubing 25, the other end of which is connected to a fitting 26. A valved port 27 may be incorporated into the head 22 for priming purposes. The stroke frequency is controlled by a knob 28 and the stroke length is controlled by a knob 29. The frequency is adjustable from 5 to 100 actuations per minute, each stroke pumping from 0.28–0.84 cc per stroke depending on stroke length. The knob 29 establishes the stroke length at any point between 10% to 100% of its maximum.

The apparatus 10 further comprises a water delivery mechanism 30 which includes an inlet port 31 for connection to a supply of water. Fitting 32 connects the inlet port 31 to a solenoid valve 33 which is normally closed. As soon as power is supplied to the apparatus 10, the valve 33 is opened and water flows through tubing 34 into a flow meter 35. An operative embodiment incorporated a flow meter 35 made by King Instruments, inc. of Huntington Beach, Calif. It has a knob 36 to control the rate of water flow from 0.25 to 10 gallons per minute.

Figure 6:
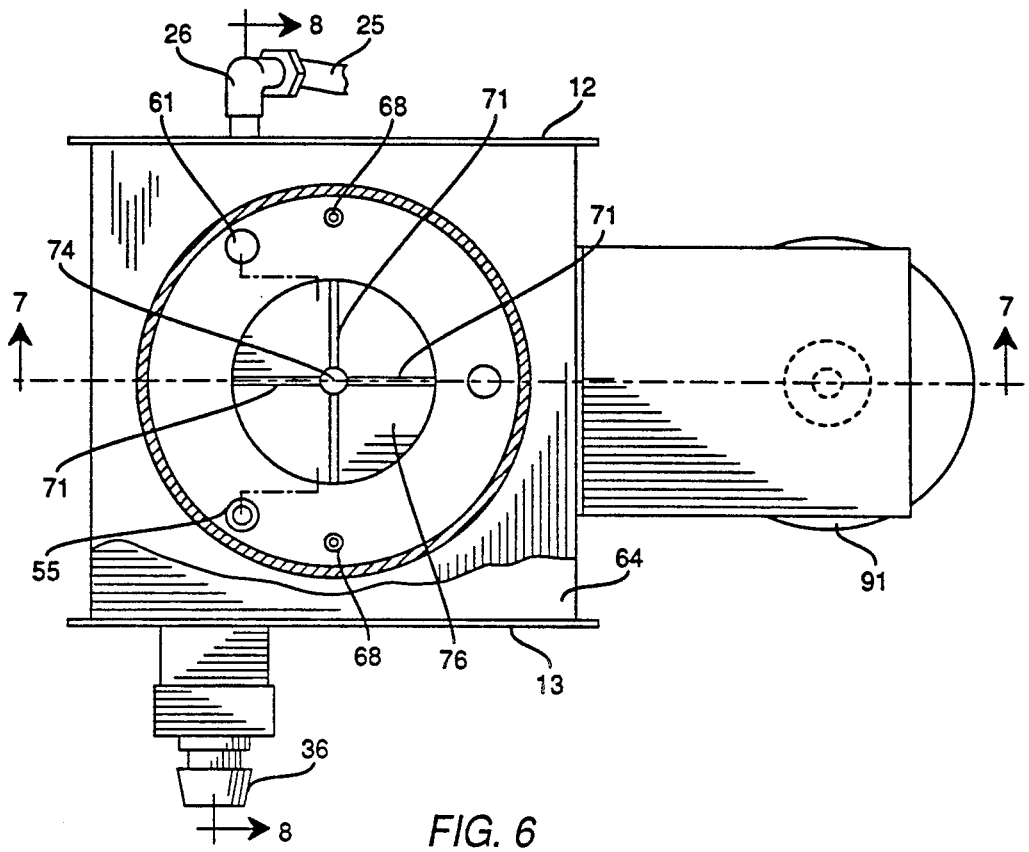
FIG. 6 is a view in horizontal section taken along the line 6—6 of FIG. 8.
Figure 7:
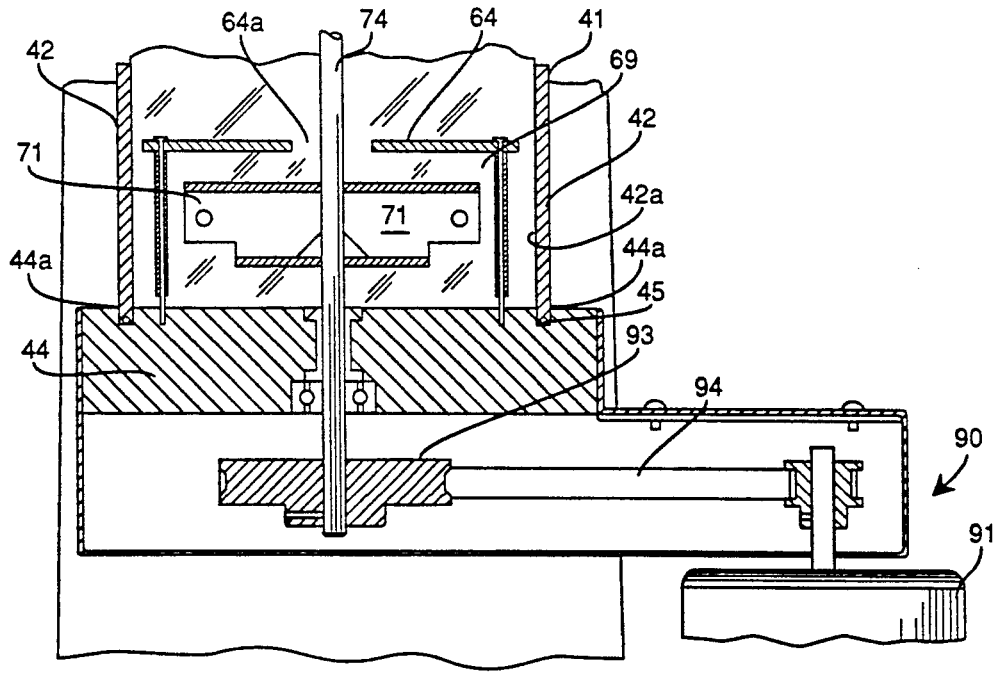
FIG. 7 is a view in vertical section taken along the line 7—7 of FIG. 6.
Figure 8:
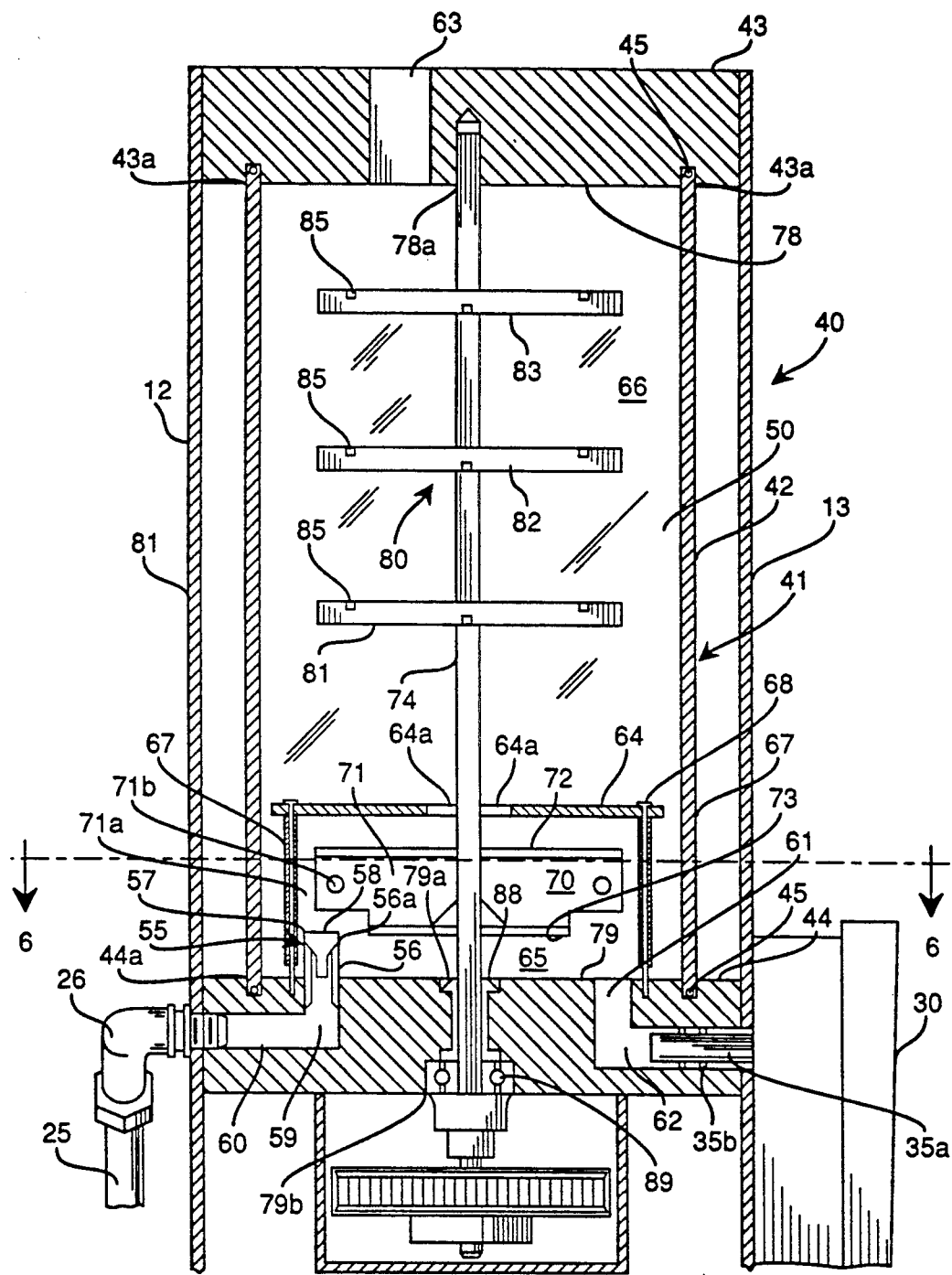
FIG. 8 is a view in vertical section taken along the line 8—8 of FIG. 6.

The apparatus 10 further comprises a mixer 40, the details of which are best seen in FIGS. 6–8. The mixer 40 comprises a cylindrical vessel 41 defined by a generally cylindrical barrel 42 and square top and bottom walls 43 and 44. The barrel 42 is preferably formed of clear acrylic so that the operator can observe the interior and thus know whether any malfunction is occurring. The bottom of the top wall 43 and the top of the bottom wall 44 have respective circular grooves 43a, 44a therein with a diameter equal to the diameter of the barrel 42 and respectively receiving O-rings 45 therein. The ends of the barrel 42 are located in the grooves in contact with the O-rings 45. A suitable clamping means (not shown) is provided to clamp the barrel 42 between the top wall 43 and the bottom wall 44, to compress the O-rings 45 so as to define a liquid-tight chamber 50 inside the vessel 41.

Located within the chamber 50 is a check valve 55, which defines a polymer inlet for the vessel 41. In an operative embodiment, the check valve 55 was supplied by Circle Seal Corp. of Anaheim, Calif. The check valve includes a valve body 56 having one end 56a formed with a valve seat 57 which is engaged by a valve member 58. The other end of the valve body 56 fits within a vertically oriented bore 59 in the bottom wall 44. The bore 59 communicates with a polymer inlet bore 60, which is horizontally oriented. The outer end of the bore 60 is threaded and receives the fitting 26 on the end of the polymer pump outlet tubing 25. The check valve 56 enables the polymer to be admitted into the chamber 50, but precludes reverse flow of the liquid back into the polymer source when the pump is deenergized.

The bottom wall 44 defines a further vertical bore 61, defining a water inlet for the vessel 41, which communicates the lower end of the chamber 50 with a water inlet bore 62 which is horizontally oriented. The water inlet bore 62 receives an outlet tube 35a of the flow meter 35, suitable fluid sealing means 35b is provided between the surface of tube 35a and the inner surface of the water inlet bore 62.

As shown best in FIG. 6, the polymer inlet, defined by valve 55, and the water inlet defined by bore 61, are located in the bottom wall 44 and aligned with one another, offset laterally relative to the diameter of the bottom wall 44. An impeller mechanism 70 is mounted for rotation in overlying relationship within water inlet 61 and polymer inlet 55, the impeller rotating clockwise as viewed in FIG. 5. This causes the water entering the vessel to sweep across the outlet of the polymer inlet check valve 55 on a short path after entry into the vessel. Thus, the water, which acts as the solvent is at its maximum concentration, when it attacks the polymer, also at its maximum concentration flowing out of inlet 55.

Referring to FIG. 8, the top wall 43 has an outlet bore 63 which extends vertically through the top wall 43 and located near the center therein, communicating with the upper end of the chamber 50. A drain bore (not shown) may be provided in the bottom wall 44 to facilitate draining of the vessel 41.

The inlet of the flow meter 35 is connected to the tubing 34 and the outlet is connected to the inlet bore 62. Thus, water flows through the flow meter 35, through the bore 62, to the bore 61, and then vertically upwardly exiting into the chamber 50. Concentrated polymer is moved by the pump through the bore 60 and into the bore 59 where it moves vertically through the check valve 55 and exits into the chamber 50. The polymer activation apparatus 10 is a continuous flow process apparatus with the pressure of the water moving the polymer through the vessel.

A baffle 64, which is a circular plate-like member, is mounted within the vessel 41 near the bottom wall 43 dividing the chamber 50 into a lower portion or zone 65 and an upper portion or zone 66. The outer diameter of the baffle corresponds to the inner diameter of the barrel, and the baffle has a central aperture 64a which provides the outlet for the lower zone 65 of the vessel, communicating a fluid flow path 69 at the top of the lower zone 65 with the upper zone 66. The baffle and its central aperture 64a which forms the outlet of the lower zone 65, causes retention of the polymer in the lower zone 66. Baffle 64 defines the uppermost part of the high shear zone thereby confining that zone and hence contributing to the intensity of turbulence which is created by impeller 70. The baffle 64 is supported above the upper surface of the bottom wall 43 by a pair of hollow spacer tubes 67 which are interposed between the baffle and the bottom wall and held in place by long bolts 68 the shanks of which pass through the tubes 67 and have threaded ends received in tapped apertures in the upper surface of the bottom wall. In one embodiment for the vessel 41 which was constructed, the lower zone 65 comprises approximately twenty percent of the volume of the chamber 50 and the upper zone 66 comprised the remaining eighty percent of the volume of the chamber 50. However, other proportions for the zones may be used, such as one-third of the volume for the lower zone and two-thirds of the volume for the upper zone. Also, although the baffle 64 defines only two zones, further baffles may be provided to define additional mixing zones within the vessel 41.

Figure 9:
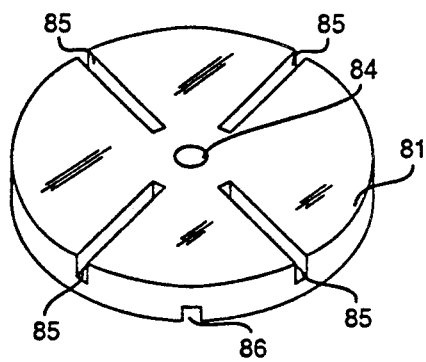
FIG. 9 is an isometric view of one of the impellers of the apparatus.
Figure 5:
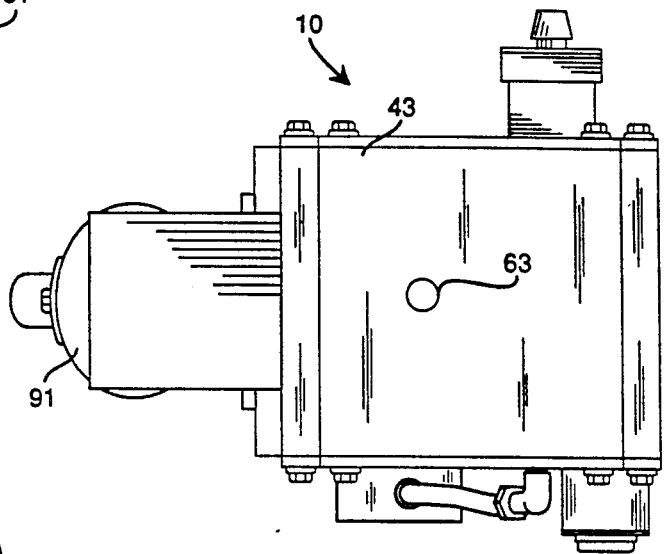
FIG. 5 is a top plan view of the apparatus.
Figure 10:
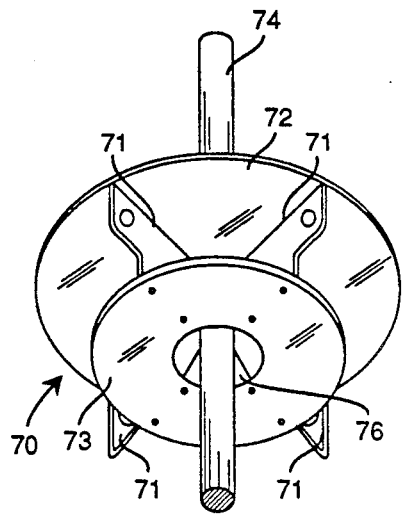
FIG. 10 is an isometric view from the bottom of another one of the impellers of the apparatus; and, FIG. 11 is an isometric view from the top of the impeller shown in FIG. 10.
Figure 11:
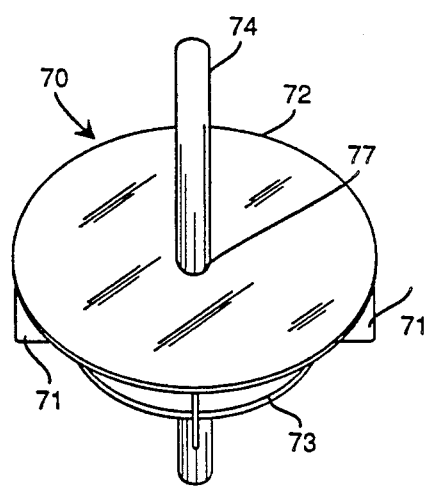

Referring to FIGS. 8–10, the mixer 40 also comprises an impeller mechanism 70 located in the lower zone 65 to mix liquids introduced into the chamber 50 and an agitator embodied as a further impeller mechanism 80, located in the upper zone 66. The impeller mechanism 70 includes four fins 71, a top plate 72 and a bottom plate 73, the fins extending outward radially from the shaft 74, each being at right angles with respect to adjacent fins and being sandwiched between the top and bottom plates. The four fins 71 are secured by their upper and lower edges to the lower surface of plate 72 and upper surface of plate 73, respectively, in a suitable manner. The shaft 74 extends through the centers of the plates 72 and 73 and vertically within the chamber 50.

The bottom plate 73 has a vertically extending aperture 76 therein through which passes the shaft 74 and the top plate 72 has an aperture 77 for receiving and securing the impeller mechanism 70 to the shaft 74. The diameter of aperture 76 in the bottom plate is substantially greater than the diameter of the shaft 74 defining a circular passageway at the bottom center of the bottom plate 73.

Each fin has a rectangular notch 71a in its lower outer edge and an aperture 71b thereabove. As shown in FIG. 8, the notch 71a affords clearance for the lower edge of the vane relative to the vertically projecting check valve 56. In addition, the notch 71a and the aperture 71b enhance movement of the fins through the polymer adding to the turbulence generated by the impeller as it rotates. The impeller is large relative to the lower processing zone 65 and as shown in FIG. 8, the vertically oriented fins 71 extend approximately half the vertical height of the zone 65. Thus, the fins 71 have a surface area corresponding to approximately one-half the vertical cross-sectional area of the lower zone 65. The top plate 72 is attached to the shaft in a suitable manner and extends in a parallel spaced relation with the baffle plate 64, defining the fluid flow path 69. As the impeller 70 rotates, the polymer is moved outward towards the wall 42a of the vessel, and thus, the impeller moves the polymer away from the outlet 64a which is located above the center axis of the impeller. When the polymer reaches the outer radial edge of the impeller, the dispersed polymer moves upwardly into the flow path 69 and is moved inwardly along the flow path 69 towards the aperture 64a for discharge into the upper zone 66. As has been indicated the flow of the dispersed, polymer is directed by the force of the pressure of the water being supplied to the water inlet 61 of the lower zone 65.

The lower surface 78 of the top wall 43 includes a vertical slot 78a in which the upper end of the shaft 74 is received, and the upper surface 79 of the bottom wall 44 includes an enlarged portions 79a and 79b, which receive, respectively, a mechanical seal 88 and a bearing 89 in which the lower end of the shaft is journalled. The impeller mechanism 70 is thus rotatably mounted in the vessel 41 about a vertical axis.

The impeller 80, which is located in the upper zone 66, includes three plate-like disc members 81–83, each having a central aperture 84 through which passes and whereby the disc member are attached to the shaft 74. The three disc members 81–83 are spaced apart from one another along the length of the shaft 74, with adjacent disc members 81,82, and 82,83 being spaced apart from one another by the same distance. When the shaft 74 is rotated, the disc members 81–83 move in open volume in the upper processing zone 66.

Each of the disc members, such as disc member 81 has a set of four radially extending grooves 85 in its upper surface, at right angles with respect to each other, and a further set of four radially extending grooves 86 in its lower surface, at right angles to each other, but offset 45° relative to the grooves 85 in the upper surface of the disc member 81. The grooves in the three disc members 81–83 increase the effective surface area of the disc members which contacts the mixture being processed in the upper zone 66. The slot depth is selected as a function of the amount of energy to be imparted to the mixture for a given shaft speed. The deeper the grooves, the greater the amount of energy which is imparted to the mixture. Although the grooves are illustrated as extending to a depth corresponding to about half the thickness of the disc member, it is apparent that due to the offset spacing of the grooves on the upper and lower disc member surfaces, the grooves could be deeper than half the thickness of the disc member.

In one embodiment of the apparatus 10 constructed, the diameter of the disc members 81–83 is 4 inches, the thickness of the disc members is ¼ inch and the depth of the grooves 85 and 86 is ⅛ inch by ⅛ inch wide.

The polymer activation apparatus 10 further comprises a drive mechanism 90 for rotating the impeller shaft 74. Referring back to FIGS. 1–4, the drive mechanism 90 includes a motor 91 attached to the front panel 12 adjacent the upper end thereof. In an operative embodiment, the motor 91 developed ¼ horsepower at 1,750 rpm. The motor 91 is geared down so that the impeller mechanism 70 operates at 400 to 1000 rpm. The rotating shaft of the motor 91 carries a toothed pulley 92 aligned with a toothed pulley 93 on the shaft 74 of the impeller mechanism 70. A toothed belt 94 engages the pulleys 92 and 93 so that operation of the motor 91 causes the shaft 74 to rotate. Because the two impellers 70 and 80 are carried by the shaft 74, they are rotated at the same speed. Power for the motor 91 is derived by wires in a conduit 97 connected to a switch box 98 having a switch 99. Cord 100 supplies power to the switch box 98 by way of a plug 101 which is inserted into an electrical receptacle such as a wall outlet. A cord 102 supplies electrical power to the switch box 98. Tubing (not shown) connects the outlet fitting 23 (FIG. 1) to the site at which the diluted polymer will be utilized. For example, it is contemplated that the drum of concentrated polymer and the polymer activation apparatus 10 will be located next to equipment which will deliver the diluted polymer into water to be treated.

In operation, with reference to FIGS. 1–4 and 8, the polymer activation apparatus 10 is placed near a drum of concentrated polymer, which may be highly viscous. Tubing connected to the fitting 23 is inserted into the polymer. A source of water is connected to the inlet 31. When power is applied inserted into the wall outlet, the solenoid valve 33 is automatically opened and water is delivered to the flow meter 35, irrespective of the condition of the switch 99. Accordingly, water immediately flows through the flow meter 35 and into the chamber 50, filling the same and exiting through the outlet bore 63 into the water treatment equipment (not shown).

When the switch 99 is operated to the "on" position, the pump 21 becomes energized and it withdraws the concentrated polymer from the drum and moves it through the tubing 25 and the bore 60 and through the valve 55 into the chamber 50. The desired concentration of the resultant product is determined by selecting the flow rates of the polymer and the water. In the case of the polymer, the knobs 28 and 29 are adjusted and in the case of the water, the knob 36 is adjusted. When the switch 99 is operated to the "on" position, this also energizes the motor 91, which rotates the impeller shaft 74 to drive the paddle-wheel impeller 70 and the disc member 80.

The polymer activation apparatus provides a continuous flow process, with the mixture moving through the vessel under the force of the water supplied under pressure to the water inlet of the vessel. In the lower zone 65 of the mixing chamber, the high-speed multi-blade paddle wheel impeller 70 subjects the polymer and water to a high shear rate for a short contact time. In the lower zone 65, water is the attacking medium. The high shear rate created by the impeller 70 drives the water into the polymer molecules while the molecules are not fragile, initiating activation and dissolution. This provides more uniform wetting of the polymer so as to avoid damaging the molecule as would decrease the usefulness of the polymer. The flow in the lower processing zone 65 is highly turbulent causing the polymer to begin dissolution and activation, water flow moves the polymer solution upwards.

The shaft 74 rotates the impeller mechanisms 70 and 80 clockwise (as viewed in FIG. 6), the polymer initially being directed down and beneath the impeller mechanism 70, upward through the central aperture 76 in the bottom plate 73, and into the space between the top plate 72 and the bottom plate 73. As the impeller mechanism 70 rotates, the polymer is moved outwardly radially away from the center of impeller mechanism to the edge of the impeller mechanism and is then moved upwardly into flow path 69 and along the flow path 69 to the outlet aperture 64a under the force of the water being supplied to the lower zone 65.

The polymer moves upwardly through the opening in the baffle 64 and into the upper zone 66 of the mixing chamber where the three slotted disc members are rotating on a shaft 74. The disc member 80 is a low energy device which imparts a lower shear rate to the mixture. The slots 84 and 85 in the disc members facilitate further mixing of polymer and water and move the polymer radially outward towards the side of the vessel. In the upper zone 66, dilute polymer is the attacking medium. The flat disc members move in open volume through the polymer and drag the polymer across the surfaces of the disc members and radially outward through the grooves. This results in lower shear rate mixing with flow through the upper processing zone 66 being characterized as laminar to mildly turbulent. The disc impeller 80 continues the dissolution and activation process in the upper mixing zone 66. The force of the water supplied to the inlet zone 65 causes the diluted polymer in the zone 66 to exit the mixing chamber 50 through the outlet bore 63, centrally located at the top thereof, and is supplied to water treatment equipment (not shown).

Of importance is the time that the water and polymer is retained in the two processing zones in the vessel 41. If the retention time in the lower zone 65 is too long, the polymer will have been exposed to the high shear created by the impeller mechanism 70 for an excessive period. This could cause the polymer to lose effectiveness. If the retention time in the upper zone 66 is too short, the polymer would not have an opportunity to be sufficiently activated to become effective. It has been determined that the preferred range of retention time in the entire chamber 50 is between 30 seconds and 7 minutes. In an operative embodiment, the volume of the vessel 41 was such as to be capable of holding 2.7 gallons of liquid. The rate of flow of the water was adjustable between 0.25 and 10 gallons per minute. At the 6 gallon per minute rate, the retention time in the lower zone 65 and upper zone 66 would be 6 seconds and 24 seconds, respectively. At the 0.5 gallon per minute rate, the retention time in the lower zone 65 would be 1.1 minutes and upper zone 66 would be 4.3 minutes.

A static mixer (not shown) may be interposed between the outlet 63 and the process to which the activated polymer is applied. In such static mixer, flow condition is essentially fully laminar, wherein gentle mixing conditions prevail and the degree of dissolution or activation, that is to say the reduction of entangled polymer chains or coils and the general conformational characteristics of the polymer, are brought to an optimum with respect to the intended application. This step may be assisted by additional ingress of water such that the polymer need not be diluted further prior to its application and in general the exiting polymer solution strength will be in the range 0.01 to 0.4% and most preferably within the range 0.05 to 0.2%.

It will be appreciated that while the foregoing description of the polymer activation apparatus includes specific details as to elements such as motors, pumps, etc. and operating parameters such as flow rates, shaft speed, etc. and that such details are for the purpose of illustrating the apparatus and are not intended as a limitation of the scope of the invention.

We claim:

1. A method for activating and diluting polymer with water comprising supplying the polymer to a first processing zone of a mixing vessel, supplying the water to the first processing zone of the mixing vessel, retaining the polymer in the first processing zone for a short contact time, subjecting the polymer in the first processing zone to a high shear rate while it is retained in the first processing zone by rotating a first impeller means in the first processing zone to initiate dissolution and activation of the polymer in the water by moving the polymer in a direction away from an outlet of the first processing zone, moving the diluted polymer through the first processing zone and the outlet, and into a second processing zone of the mixing vessel, the second processing zone being isolated from the first processing zone by baffle means which includes the outlet, retaining the diluted polymer in the second processing zone for a longer contact time, subjecting the polymer in the second processing zone to a lower shear rate while it is retained in the second processing zone by rotating a second impeller means in the second processing zone to further dissolve and activate the polymer, and discharging the diluted polymer from the second processing zone.

* * * * *